UNITED STATES PATENT OFFICE.

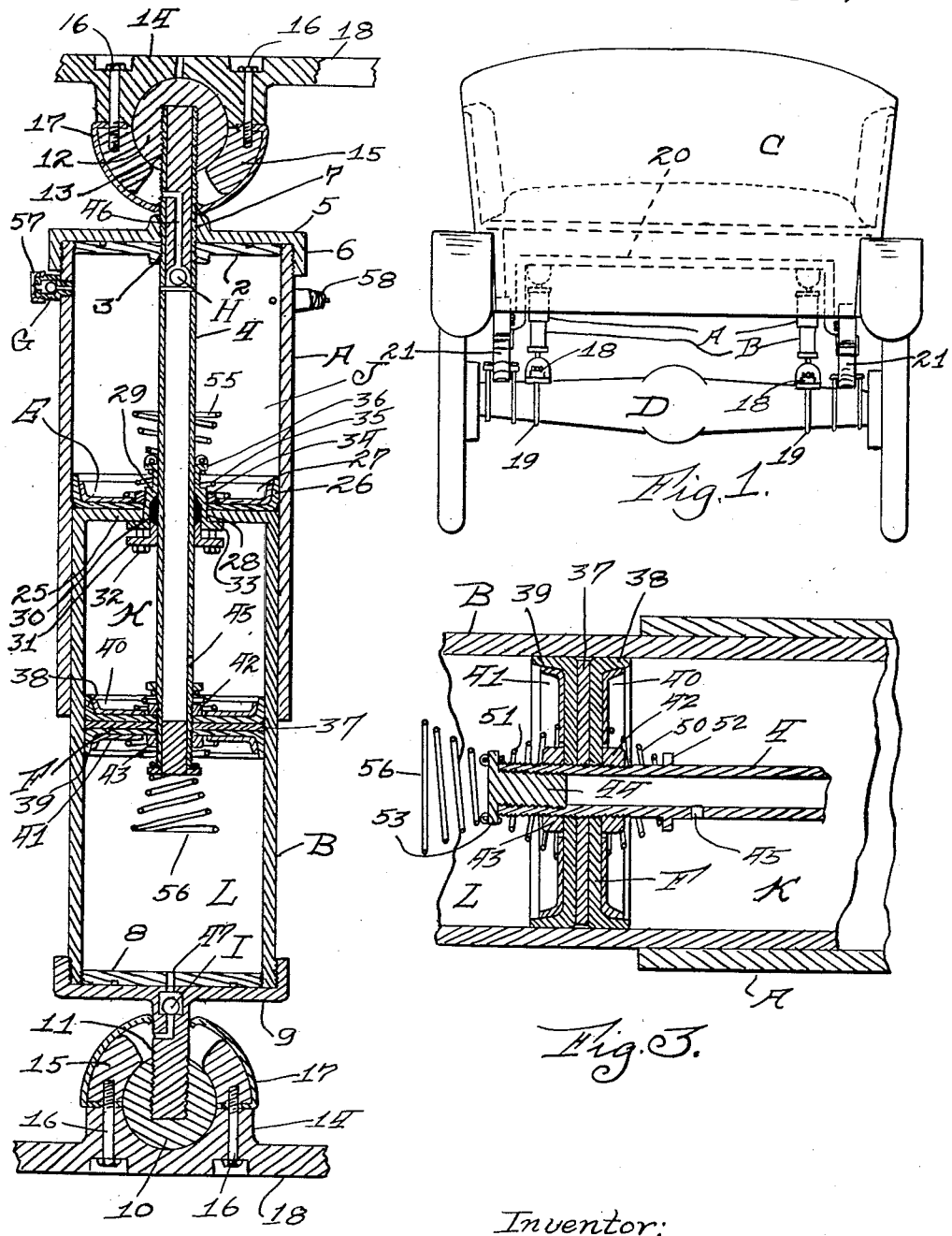

ANDREW C. DUNN, OF MINNEAPOLIS, MINNESOTA.

SHOCK-ABSORBER.

1,351,843. Specification of Letters Patent. Patented Sept. 7, 1920.

Application filed September 12, 1917, Serial No. 190,932. Renewed January 15, 1920. Serial No. 351,560.

*To all whom it may concern:*

Be it known that I, ANDREW C. DUNN, a citizen of the United States, residing at Minneapolis, in the county of Hennepin and State of Minnesota, have invented a new and useful Improvement in Shock-Absorbers, of which the following is a specification.

This invention relates to shock absorbers particularly although not exclusively for use in connection with spring supported vehicle bodies. More particularly this invention pertains to that class of shock absorbers which uses air as a cushioning medium and which is employed for reducing shock and assisting in resiliently supporting vehicle bodies upon the running mechanism of vehicles. It is one of the objects of the present invention to provide shock absorbers between the vehicle body and the axle housing of the running gear, which will efficiently and most effectively absorb any shock in supporting the load and assist in interposing cushioning means both for the up and down movement of the body on the axle, said means being provided with universal connections between the axle housing and the body which will conform with the load and permit free lateral movement of the body at all times. Another object of the invention is to provide improved construction of shock absorbers which is durable, simple and inexpensive, and which is not liable to disorder after long continued use.

With these and other objects in view, my invention comprises the features of construction and combination of parts hereinafter more particularly described and claimed, particular reference being had to the accompanying drawing, in which Figure 1 is a rear end view of an automobile showing my invention applied thereto; Fig. 2 is a vertical section of one of my improved shock absorbing elements, part of the fastening means by which the invention is attached to the vehicle being illustrated, and Fig. 3 is a section of a detail enlarged.

In the drawing let A and B indicate two telescopically connected cylindrical shells which are free to slide together up and down. The upper end of the outer cylindrical shell A is closed by a disk 2, which is threaded into said shell, said disk being formed with a central aperture 3, which receives a vertical tubular stem 4. Placed over the upper end of said cylindrical shell A is a cap 5, which has a peripheral flange 6 threaded over the outer end of said cylindrical shell and a threaded aperture 7 in which a threaded portion of the tubular stem 4 is secured. Likewise the lower end of the inner cylindrical shell B is closed by a disk 8, which is threaded therein and a cap member 9, which is secured by threaded engagement over the lower end of said cylindrical shell B. The cap 9 carries a depending bearing ball 10 connected thereto by the neck 11 and the upper projecting end of stem 4 likewise carries a bearing ball 12, which is secured thereto by the threaded engagement 13. These bearing balls are secured by similarly constructed socket members to the body C of the vehicle constituting the load and to the housing D of the rear axle of the vehicle, (see Fig. 1).

Each of these socket members comprises a socket piece 14, in which the ball is seated and a retainer 15, which is secured to the socket by bolts 16 or other suitable means, a flexible dust guard 17 being placed over the retainer and clamped between said retainer and socket. Each socket member is formed with bosses 18, which receive a U-bolt 19 placed around the object such as the axle housing D or a supporting rod 20 for holding the shock absorber in place, that is interposed between the load and the running gear of the vehicle. The supporting member 20 is directly connected to the body adjoining the springs 21 and constitutes a convenient means by which the upper ends of the shock absorbers are held in place, it being understood that two or any number of shock absorbing elements such as described may be secured in position to perform their function between the load and the running gear as illustrated for example in Fig. 1.

Arranged within the cylindrical telescopic element are suitable pistons E and F, they being specially constructed to prevent leakage of air as much as possible. The piston E is formed on the inner closed end 25 of the cylindrical shell B and carries an upturned flexible cup washer 26 made of leather or other suitable material and held to the end of the cylinder element B by means of the metal washer 27. Extending through a suitable opening 28 in the central portion of the end 25 of the cylinder element B is a gland cup 29 containing the packing 30 surrounding the stem 4 and pressed into tight engagement by the compressor element 31, which is bolted at 32 to a flange or shoulder 33, said shoulder pressing against the inner surface of the end wall 25. The gland cup 29 is secured upon the end 25 by a nut 34, which is threaded on the stem 4 and engages and holds the central portion of said flexible washer, and a spring 35 engaging the gland cup below the annular shoulder 36 presses the washer 27 adjacent to the end 25 and urges the rim portion tightly around the inner wall of the cylinder element A. Thus when the telescopic cylindrical shells A and B slide together, air tight joints are produced between the moving parts and air is compressed in the chamber J, and acts as a cushion to absorb shocks. A suitable check valve G is placed in the upper end of the wall of the cylindrical element A, and is adapted to prevent egress of air from chamber J, but allows air to be drawn into said chamber when the cylindrical elements A and B are moved into extended position. This check valve will admit air into the chamber J whenever any leakage occurs between the piston and cylinder elements or any of the joints of the structure.

The piston element F is mounted upon the lower end of the stem 4 and is held rigidly thereby, while the cylinder element B raises and lowers. This piston element comprises a centrally disposed rigid disk 37, a pair of oppositely arranged flexible cup washers 38 and 39 placed on the opposite faces of said disk and a pair of rigid cup washers 40 and 41 placed against the upper and lower faces of the flexible washers, the parts 37, 38 and 39 being clamped together by a pair of nuts 42 and 43 threaded on the lower end of the stem 4. The lower end of the stem 4 is closed by the plug 44 and the stem is provided with an air passage 45, which forms a communication between the space within the stem and the air chamber K in the cylinder element B between the closed end 25 of the latter and the piston F. The upper end of the stem 4 has an air ingress passage 46, which forms a communication between the outer atmosphere and the space within said stem. This air ingress passage 46 is closed by a check valve H, which automatically opens and allows air to pass freely through the stem and into the chamber K when the chamber K is enlarged by the cylinder elements A and B closing together. The chamber L which is formed in the lower end of the cylinder element B below the piston element F has an air ingress duct 47 leading out through the lower end of the cylinder element B and the neck 11 of the bearing ball 10 and communicating with the outer atmosphere, said passage 47 being closed automatically by the check valve I in said neck against air passing outwardly from the chamber L, but allowing air to be admitted into said chamber when the cylinder elements A and B move into outermost position. The washers 40 and 41 are pressed tightly against flexible washers 38 and 39 to produce tight fitting joints between piston element F and cylinder element B by means of a pair of helical springs 50 and 51 which are respectively engaged and held on the stem 4 below annular shoulders 52 and 53.

In the application of my invention the pneumatic cylinders A and B are connected by the socket members 18 and U-bolts to the cross bar 20 and rear axle housing D as illustrated in Fig. 1. Normally the pistons E and F resting upon the air cushions thus produced in the upper and lower ends of the cylinders A and B assist in supporting the load and absorb shocks in an upward direction by the running gear. The air cushion produced in chamber K likewise acts as a shock absorber in the reverse direction and prevents back lash shocks. Thus shocks both in an up and down direction are absorbed. The valved air ingress ducts entering each of the air compression chambers serve to maintain normal air pressure in the air chambers when the cylinder elements are in normal extended position. To lubricate the working parts in the device, a small amount of oil may be placed in the cylinders.

To prevent sudden jar or pounding at the extreme outermost positions of the cylinders, coil bumper springs 55 and 56 are placed around and secured respectively to the gland cup 29 and the inner end of stem 4, said springs being arranged to press against the ends 2 and 8 of the cylinders and gradually absorb any shock when the cylinders and pistons close fully together.

Should it be desired to operate chamber J under increased air pressure valve G may be closed by a cap 57 and air may be forced to any desired pressure through the valved stem 58 by the application of a pump to said stem, into said chamber but in the usual operation of the device the stem 58 and cap 57 are not employed. By inflating as described the springs in case of a break or for adjustment can be relieved of the load. The use of removable stopper disks 2 and 8 in the outer ends of the cylinder and closure caps over said disks serve to produce efficient means for closing the cylinders air tight and at the same time allowing the cylinders to be opened when desired for inspecting or repairing the pistons therein.

In accordance with the patent statutes, I have described the principles of operation of my invention, together with the apparatus which I now consider to represent the best embodiment thereof, but I desire to have it understood that the construction shown is only illustrative, and that the invention can be carried out by other means and applied to uses other than those above set forth within the scope of the following claims.

Having described my invention, what I claim as new and desire to protect by Letters Patent is:—

1. The combination with a vehicle body and axle, of a double acting pneumatic cushioning device comprising a pair of cylinders each carrying a piston working in the opposite cylinder and dividing the cylinders into two cushioning chambers and an intermediate rebound checking chamber each of said chambers being directly connected with the outer atmosphere by a duct.

2. The combination with a vehicle body and axle, of a double acting pneumatic cushioning device comprising a pair of cylinders closed at their outer ends and each carrying a piston near its inner end working in the opposite cylinder and dividing the cylinders into two cushioning chambers and an intermediate rebound checking chamber, said parts having air ducts for the ingress of outside air directly and independently into each of said chambers and check valves in said ducts serving to automatically prevent the escape of air from said chambers through said ducts.

3. The combination with a vehicle body and axle, of a double acting pneumatic cushioning device comprising a pair of telescopic cylinders closed at their outer ends and each carrying a piston near its inner end working in the opposite cylinder and dividing the cylinders into two cushioning chambers and an intermediate rebound checking chamber, means for admitting outside air directly and independently into each of said chambers and ball and socket connections between said cylinders and said body and axle.

4. The combination with a vehicle body and axle, of a double acting pneumatic cushioning device comprising a pair of telescopic hollow cylinders closed at their outer ends, one of said cylinders being formed with a piston on its inner end working in the opposite cylinder and the other of said cylinders having an axial hollow stem projecting throughout its length, said stem carrying a piston near its inner end working in the companion cylinder, said pistons serving to divide the cylinders into two outermost air cushioning chambers and an intermediate rebound checking chamber, air ingress ducts entering said chambers through the walls of said cylinders and said stem, check valves in said ducts and movable joints securing said stem and one of said cylinders to said body and axle.

5. The combination with a vehicle body and axle, of a double acting pneumatic cushioning device comprising a pair of telescopic hollow cylinders closed at their outer ends, one of said cylinders being formed with a piston on its inner end working in the opposite cylinder and the other of said cylinders having an axial hollow stem projecting throughout its length, said stem carrying a piston near its inner end working in the companion cylinder, said pistons serving to divide the cylinders into two outermost air cushioning chambers and an intermediate rebound checking chamber, air ingress ducts entering said chambers through the walls of said cylinders and said stem, check valves in said ducts, bumper springs carried adjacent to said pistons and arranged to cushion against the outer ends of said cylinders, and movable joints securing said stem and one of said cylinders to said body and axle.

6. In a pneumatic vehicle body support of the character described, a piston, said piston comprising a bearing or guide section, a pair of oppositely turned cup leathers secured to said guide section, cup plates adapted to expand said cup leathers peripherally, and resilient means for automatically urging said plates against said cup leathers to expand the latter.

7. In a pneumatic vehicle support of the character set forth, a pair of cylinder elements telescopically joined, a stopper disk threaded in the outer end of each of said cylinder elements, and a cap secured over each disk closed end of said cylinder elements and locking said disks in place, each of said caps having a ball and socket joint by which the cylinders can be secured to the body and axle of a vehicle.

8. The combination with a vehicle body and axle, of a double acting pneumatic cushioning device comprising a pair of telescopic cylinder elements closed at their outer ends and each carrying a piston near its inner end working in the opposite cylinder and dividing the cylinders into two cushioning chambers and an intermediate rebound checking chamber, means for movably securing said cylinders to said body and axle and means for permitting one of the chambers being inflated and maintained under increased air pressure over the normal pressure of air in the other chambers to resiliently support a load.

In testimony whereof, I have signed my name to this specification.

ANDREW C. DUNN.